(12) United States Patent
Ito et al.

(10) Patent No.: US 9,049,816 B2
(45) Date of Patent: Jun. 9, 2015

(54) BUSH CUTTER

(75) Inventors: Ryosuke Ito, Anjo (JP); Koji Haneda, Anjo (JP)

(73) Assignee: MAKITA CORPORATION, Anjo (JP)

( * ) Notice: Subject to any disclaimer, the term of this patent is extended or adjusted under 35 U.S.C. 154(b) by 495 days.

(21) Appl. No.: 13/392,341

(22) PCT Filed: Jul. 22, 2010

(86) PCT No.: PCT/JP2010/062361
§ 371 (c)(1),
(2), (4) Date: Mar. 20, 2012

(87) PCT Pub. No.: WO2011/027628
PCT Pub. Date: Mar. 10, 2011

(65) Prior Publication Data
US 2012/0167539 A1 Jul. 5, 2012

(30) Foreign Application Priority Data

Sep. 2, 2009 (JP) ................. 2009-202364

(51) Int. Cl.
*A01D 34/412* (2006.01)
*A01D 34/90* (2006.01)

(52) U.S. Cl.
CPC ........ *A01D 34/902* (2013.01); *A01D 2034/907* (2013.01)

(58) Field of Classification Search
CPC ... A01D 34/412; A01D 34/90; A01D 34/902; A01D 2034/907
USPC .......... 30/276, 296.1, 312; D8/8, 61; 56/12.7, 56/17; 74/479.01
See application file for complete search history.

(56) References Cited

U.S. PATENT DOCUMENTS

| 4,006,528 | A | * | 2/1977 | Katsuya | ............... | 30/276 |
| 4,226,021 | A | * | 10/1980 | Hoff | ............... | 30/276 |
| 4,759,128 | A | * | 7/1988 | Katoh et al. | ............... | 30/276 |
| 5,433,006 | A | * | 7/1995 | Taguchi | ............... | 30/276 |

(Continued)

FOREIGN PATENT DOCUMENTS

| CN | 101438654 A | | 5/2009 |
| EP | 2474218 A1 | * | 7/2012 |

(Continued)

OTHER PUBLICATIONS

Jan. 8, 2013 Japanese Office Action issued in Japanese Patent Application No. 2009-202364 (with translation).

(Continued)

*Primary Examiner* — Jason Daniel Prone
(74) *Attorney, Agent, or Firm* — Oliff PLC

(57) ABSTRACT

A bush cutter is provided with a main pole, a cutting blade disposed at an anterior end of the main pole, a prime mover disposed at a posterior end of the main pole and configured to drive the cutting blade, and a handle disposed at an intermediate portion of the main pole and provided with a grip that is configured to be grasped by a user. The grip is provided with a driving switch for driving the cutting blade and an adjusting switch for adjusting at least one of a rotation speed and a rotation direction of the cutting blade. The driving switch and the adjusting switch are arranged so as to enable the user who grasps the grip to operate the driving switch and the adjusting switch with a hand grasping the grip without releasing the hand from the grip.

9 Claims, 9 Drawing Sheets

(56) References Cited

U.S. PATENT DOCUMENTS

| | | | | |
|---|---|---|---|---|
| D389,706 S | * | 1/1998 | Haberlein et al. | D8/8 |
| 5,718,052 A | * | 2/1998 | Taomo et al. | 30/276 |
| 5,765,445 A | | 6/1998 | Miyata | |
| 5,815,928 A | * | 10/1998 | Cline | 30/276 |
| 6,021,630 A | * | 2/2000 | Higashi et al. | 30/276 |
| 6,056,668 A | * | 5/2000 | Nagashima | 30/276 |
| 6,065,214 A | * | 5/2000 | Nagashima | 30/276 |
| 6,196,082 B1 | * | 3/2001 | Iwata | 30/276 |
| 6,508,004 B2 | * | 1/2003 | Tezuka et al. | 30/276 |
| D487,216 S | * | 3/2004 | Arvidsson et al. | D8/8 |
| 6,823,591 B2 | * | 11/2004 | Kobayashi et al. | 30/276 |
| 6,880,251 B2 | * | 4/2005 | Gambert | 30/296.1 |
| D553,937 S | * | 10/2007 | Karlsson et al. | D8/107 |
| D600,515 S | * | 9/2009 | Tinius | D8/8 |
| D625,970 S | * | 10/2010 | Tinius | D8/1 |
| D625,971 S | * | 10/2010 | Tinius | D8/1 |
| 7,805,844 B2 | * | 10/2010 | Yoshida | 30/276 |
| 7,891,099 B2 | * | 2/2011 | Wenckel | 30/276 |
| 8,127,455 B2 | * | 3/2012 | Wenckel et al. | 30/276 |
| 8,151,471 B2 | * | 4/2012 | Tomiyama et al. | 30/276 |
| D690,569 S | * | 10/2013 | Tinius | D8/61 |
| D692,287 S | * | 10/2013 | Tinius | D8/61 |
| 8,549,758 B2 | * | 10/2013 | Ito et al. | 30/276 |
| 2003/0101593 A1 | * | 6/2003 | Nagashima | 30/276 |
| 2003/0192188 A1 | * | 10/2003 | Nagashima et al. | 30/276 |
| 2006/0248731 A1 | | 11/2006 | Suzuki et al. | |
| 2007/0067947 A1 | | 3/2007 | Hittmann et al. | |
| 2008/0236124 A1 | * | 10/2008 | Heinzelmann | 56/12.7 |
| 2009/0113724 A1 | * | 5/2009 | Wied et al. | 30/276 |
| 2009/0223017 A1 | | 9/2009 | Hittmann et al. | |
| 2009/0229131 A1 | | 9/2009 | Tomiyama et al. | |
| 2010/0001675 A1 | | 1/2010 | Matsunaga et al. | |
| 2010/0012338 A1 | * | 1/2010 | Okabe et al. | 30/312 |
| 2010/0294098 A1 | * | 11/2010 | Nakadate et al. | 30/276 |
| 2010/0313430 A1 | * | 12/2010 | Yamaoka et al. | 30/276 |
| 2010/0314146 A1 | | 12/2010 | Kondo et al. | |
| 2010/0319203 A1 | * | 12/2010 | Ito et al. | 30/286 |
| 2011/0131816 A1 | * | 6/2011 | Ito | 30/276 |
| 2011/0131817 A1 | * | 6/2011 | Ito | 30/276 |
| 2011/0203118 A1 | * | 8/2011 | Saito | 30/276 |
| 2012/0246943 A1 | * | 10/2012 | Yuasa | 30/276 |
| 2012/0279743 A1 | * | 11/2012 | Suda et al. | 173/176 |

FOREIGN PATENT DOCUMENTS

| | | | |
|---|---|---|---|
| JP | A-9-53475 | | 2/1997 |
| JP | A-H09-49445 | | 2/1997 |
| JP | A-10-56845 | | 3/1998 |
| JP | A-2001-107752 | | 4/2001 |
| JP | A-2006-217843 | | 8/2006 |
| JP | A-2006-314277 | | 11/2006 |
| JP | A-2007-089582 | | 4/2007 |
| JP | A-2008-271830 | | 11/2008 |
| JP | A-2009-125056 | | 6/2009 |
| JP | A-2009-219427 | | 10/2009 |
| JP | A-2010-12571 | | 1/2010 |
| JP | 2011050312 A | * | 3/2011 |
| JP | 2011050313 A | * | 3/2011 |
| JP | 2013138689 A | * | 7/2013 |
| KR | 20020061505 A | * | 7/2002 |
| WO | WO 2009/098984 | | 8/2009 |
| WO | WO 2011027628 A1 | * | 3/2011 |
| WO | WO 2011027629 A1 | * | 3/2011 |

OTHER PUBLICATIONS

Office Action issued in Russian Patent Application No. 2012112541 dated May 17, 2013 (with translation).

Aug. 30, 2012 Statement of Third Party Submission filed in Japanese Patent Application No. 2009-202364 (with translation).

Translation of International Search Report mailed Oct. 5, 2010 issued in International Patent Application No. PCT/JP2010/062361.

Written Opinion mailed Oct. 5, 2010 issued in International Patent Application No. PCT/JP2010/062361 (with translation).

Jan. 22, 2014 Office Action issued in European Patent Application No. 10 813 579.9.

Chinese Office Action issued in Chinese Application No. 201080039249.3 mailed Sep. 4, 2013 (with translation).

Office Action issued in European Application No. 10813579.9 dated Aug. 9, 2013.

Dec. 11, 2012 Extended Search Report issued in European Patent Application No. 10813579.9.

Apr. 8, 2014 Office Action No. 2014040201045780 issued in Chinese Patent Application No. 201080039249.3 (with translation).

May 7, 2014 Office Action issued in Japanese Patent Application No. 2013-089321 (with translation).

* cited by examiner ns the grip. According to this composition, the user is

BUSH CUTTER

TECHNICAL FIELD

The present invention relates to a bush cutter (or brush cutter) typically used for cutting bushes.

BACKGROUND ART

A bush cutter is disclosed in Japanese Patent Application Publication No. 2008-271830. This bush cutter comprises a main pole, a cutting blade disposed at an anterior end of the main pole, a motor unit disposed at a posterior end of the main pole, and a handle disposed at an intermediate portion of the main pole. The handle is provided with a grip that is grasped by a user. A driving switch (called a gripping switch in the disclosure) is provided for driving the cutting blade.

SUMMARY OF INVENTION

Technical Problem

The bush cutter described above is also provided with a speed adjusting switch (called a throttle lever in the disclosure) for adjusting a rotation speed of the cutting blade. The speed adjusting switch is fixed to the handle and is positioned below the grip, separately from same. According to this composition, a user is required to remove his or her hand from the grip in order to operate the speed adjusting switch, and there is a problem in that the speed adjusting switch is difficult to operate.

In an attempt to avoid this problem, the present invention provides a bush cutter whereby a user can perform required operations while firmly holding the bush cutter.

Solution to Technical Problem

A bush cutter relating to the present invention comprises a main pole, a cutting blade disposed at an anterior end of the main pole, a prime mover disposed at a posterior end of the main pole and configured to drive the cutting blade, and a handle disposed at an intermediate portion of the main pole. The handle is provided with a grip that is grasped by a user. The grip is provided with a driving switch for driving the cutting blade, and an adjusting switch for adjusting at least one of a rotation speed and a rotation direction of the cutting blade. The driving switch and the adjusting switch are arranged so as to enable the user who grasp the grip to operate the driving switch and the adjusting switch with a hand grasping the grip without releasing the hand from the grip.

According to this bush cutter, the user is able to operate the driving switch and the adjusting switch, respectively, without releasing his or her hand grasping the grip. The user is able to adjust the rotation speed and/or the rotation direction while firmly grasping the bush cutter.

DESCRIPTION OF EMBODIMENT

Figure 1:
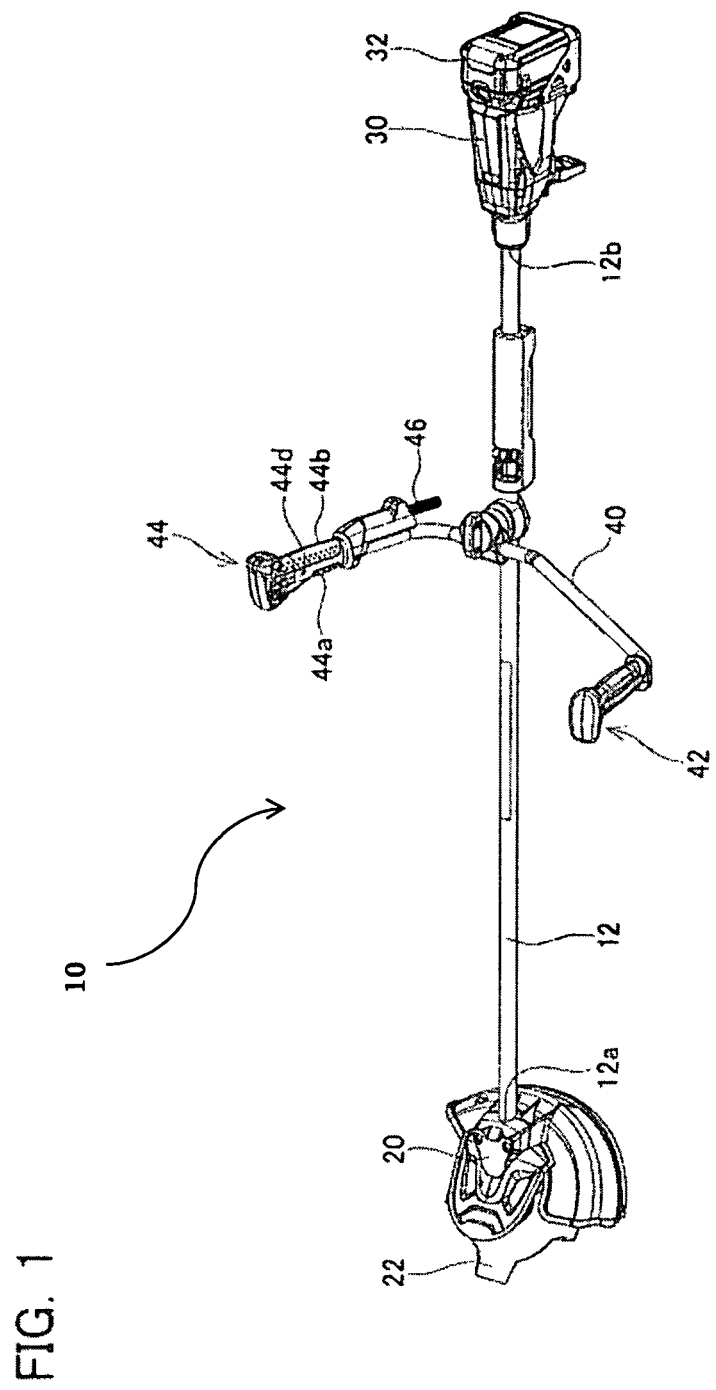
FIG. 1 shows the whole of a bush cutter according to an embodiment.
Figure 2:
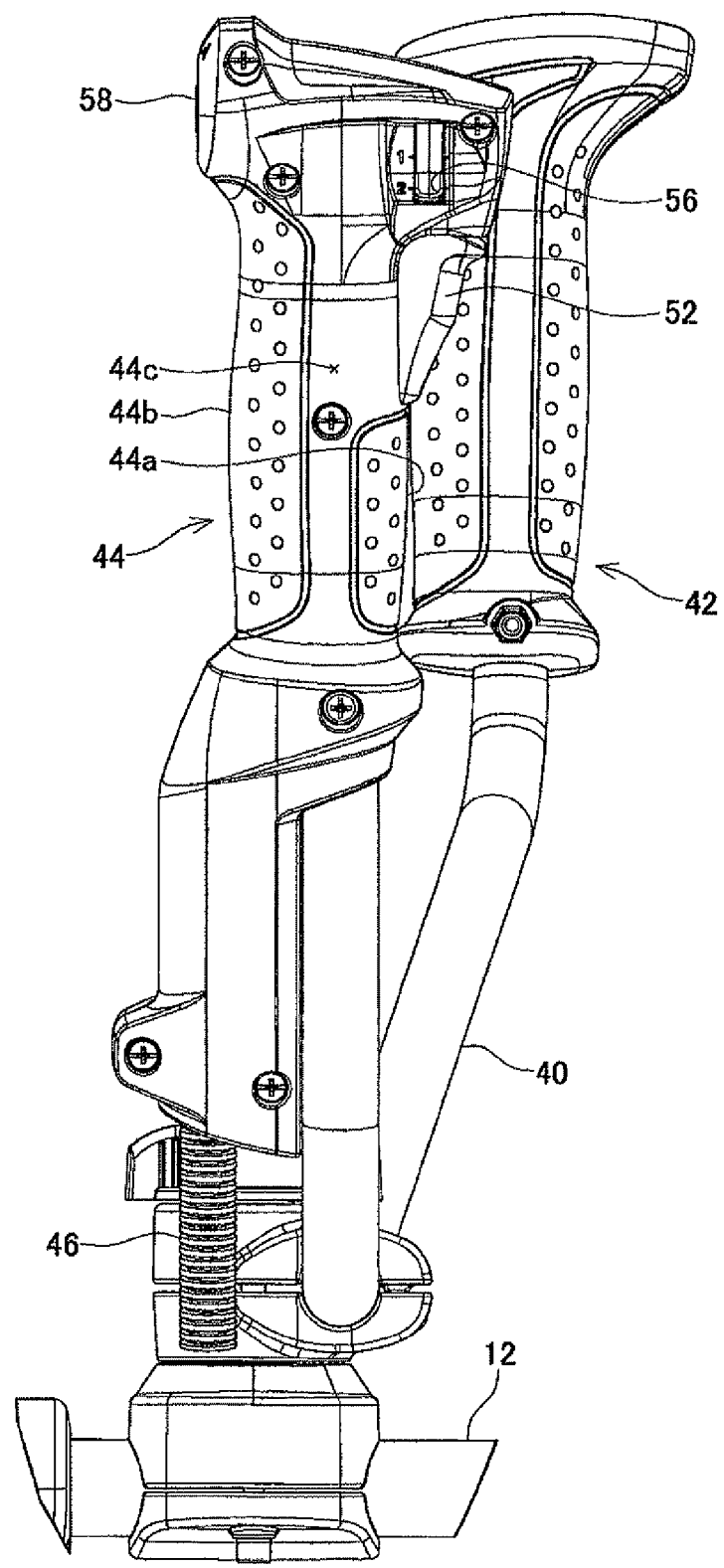
FIG. 2 shows a right side surface of a right grip.
Figure 3:
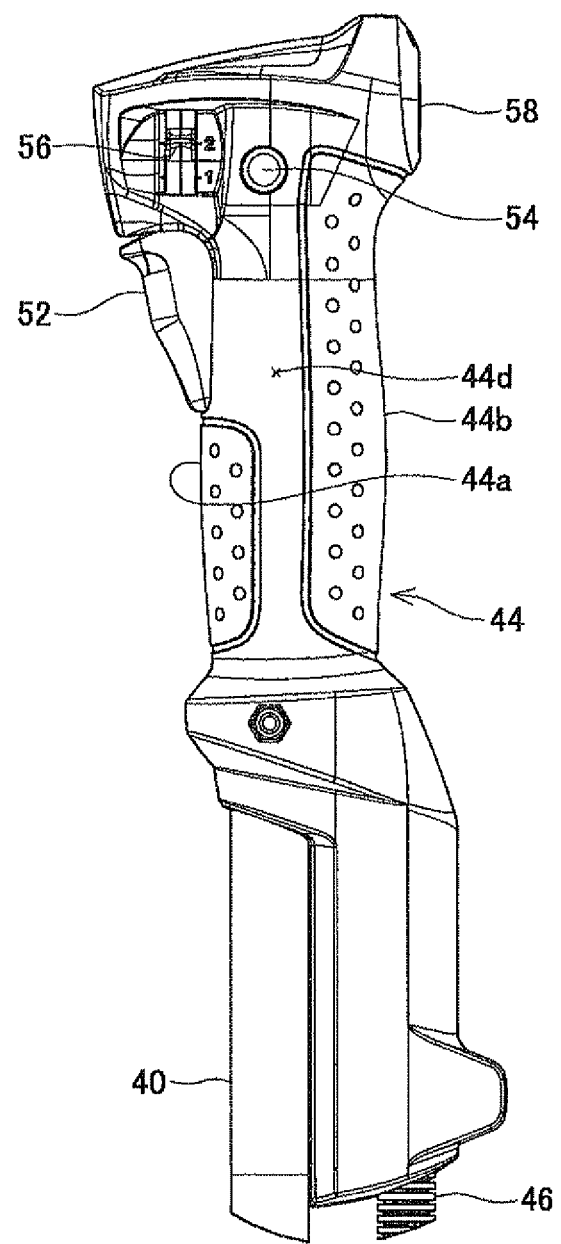
FIG. 3 shows a left side surface of the right grip.
Figure 4:
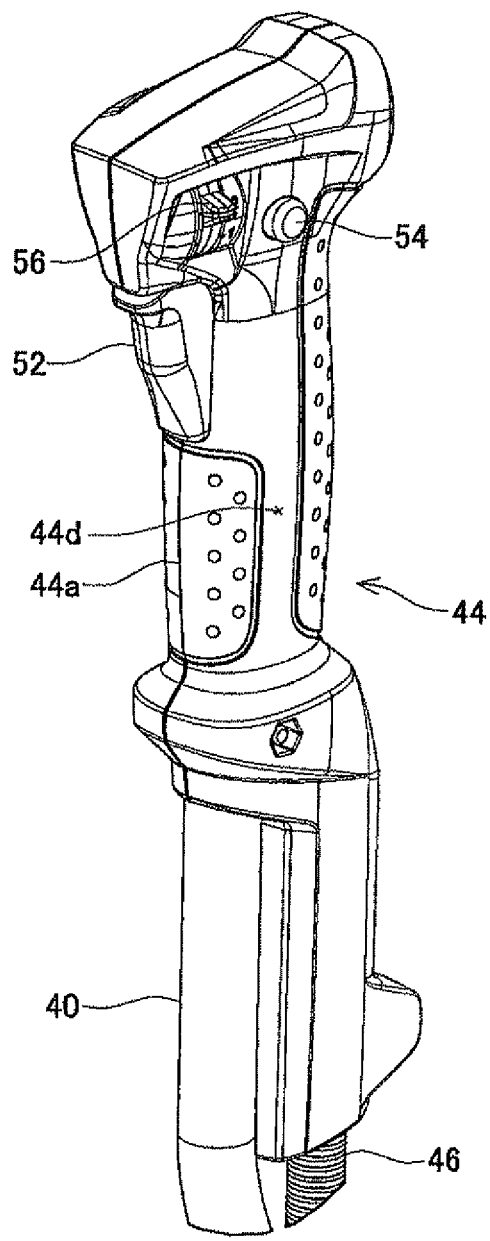
FIG. 4 is a perspective diagram showing an anterior surface and a left side surface of the right grip.

In one embodiment of the present teachings, desirably, a driving switch is positioned on an anterior surface of a grip. In this case, desirably, an adjusting switch is arranged on an upper part of a side surface of the grip or an upper part of a posterior surface of the grip.

When a user grasps the grip, generally speaking, tip portions of a second finger (index finger) to a fifth finger (little finger) of the user are positioned on the anterior surface of the grip, a palm of the user is positioned on the posterior surface of the grip which is arranged on an opposite side to the anterior surface of the grip, a first finger (thumb) of the user is positioned on one side surface of the grip, and base end portions of the second to fifth fingers are positioned on the other side surface of the grip. The user is able to move the first finger relatively freely on the upper part of the one side surface and the upper part of the posterior surface of the grip, is able to move the second finger relatively freely on the upper part of the other side surface and the upper part of the anterior surface of the grip, and is able to move the third to fifth fingers relatively freely on a lower part of the anterior surface of grip, while grasping the grip. Therefore, according to the composition described above, the user is able to operate the driving switch with any one of the second to fifth fingers, and is also able to operate the adjusting switch with the first finger or second finger, while firmly grasping the grip.

In another embodiment of the present teachings, desirably, the grip is further provided with a protection switch for disabling activation of a prime mover regardless of a status of the driving switch. In this case, desirably, the protection switch is also arranged so as to enable the user who grasps the grip to operate the protection switch with the hand grasping the grip without releasing the hand from the grip. According to this composition, even if the driving switch fails, for instance, the user is still able to halt the driving of a motor by operating the protection switch, without releasing the hand from the grip.

In another embodiment provided with the protection switch described above, desirably, the driving switch is arranged on an anterior surface of the grip, and the adjusting switch and the protection switch are arranged on an upper part of a side surface of the grip or on an upper part of a posterior surface of the grip. According to this composition, the user is able to operate the driving switch with any one of the second to fifth fingers, and is also able to operate the adjusting switch and the protection switch with the first finger or second finger, while firmly grasping the grip.

In another embodiment relating to the present teachings, the grip is provided with two switches, as the adjusting switch, including a speed adjusting switch for adjusting the rotation speed of the cutting blade and a direction changing switch for changing the rotation direction of the cutting blade. In this case, desirably, both the speed adjusting switch and the direction changing switch are arranged so as to enable the user who grasps the grip to operate either the speed adjusting switch or the direction changing switch with the hand grasping the grip without releasing the hand from the grip. According to this composition, the user is able to perform operations of driving the cutting blade, stopping the cutting blade, adjusting the rotation speed of the cutting blade and switching the rotation direction of the cutting blade, appropriately, without releasing the hand from the grip.

In another embodiment in which the grip is provided with two switches including the speed adjusting switch and the direction changing switch, desirably, the driving switch is arranged on the anterior surface of the grip, and the speed adjusting switch and the direction changing switch are arranged on the upper part of the side surface of the grip or the upper part of the posterior surface of the grip. According to this composition, the user is able to operate the driving switch with any one of the second to fifth fingers, and is also able to operate the direction changing switch, the speed adjusting switch and the protection switch with the first finger or second finger, while firmly grasping the grip.

More specifically, desirably, the driving switch is arranged on the anterior surface of the grip, the direction changing switch is arranged on the upper part of the posterior surface of the grip, and the speed adjusting switch and the protection switch are arranged on the upper part of the side surface of the grip. Moreover, desirably, the speed adjusting switch is arranged to the front of the protection switch. According to this composition, the switches are arranged in positions where they can be operated readily by the user, in accordance with a frequency of operation by the user.

In another embodiment of the present teachings, it is possible to employ a trigger type switch for the driving switch. This driving switch can be arranged at a position where the second finger and the third finger of the user's hand which is grasping the grip are arranged on the anterior surface of the grip. The driving switch may be a switch which changes the rotation speed of the cutting blade in accordance with an amount of operation by the user. In this case, it is possible to adopt a composition in which the rotation speed of the cutting blade becomes faster, the further the driving switch is pulled by the user.

In another embodiment of the present teachings, it is possible to employ a push button type switch for the protection switch. This protection switch can be arranged in the upper part of the side surface of the grip, in a range which is reached by the first finger of the user's hand which is grasping the grip. The protection switch can be composed so as to electrically connect the motor and a power supply only when operated by the user, regardless of the status of the driving switch. Furthermore, desirably the protection switch is composed so as to mechanically disable activation of the driving switch. In other words, the protection switch permits activation of the driving switch only when the protection switch is operated by the user. Consequently, driving of the cutting blade can be disabled both electrically and mechanically, unless the user operates the protection switch.

In another embodiment of the present teachings, it is possible to employ a rocker type (see-saw type) switch for the direction changing switch. This direction changing switch can be arranged in the upper part of the posterior surface of the grip, in the range which is reached by the first finger of the user's hand which is grasping the grip.

In another embodiment of the present teachings, it is possible to employ a rotary type operating member for the speed adjusting switch. This speed adjusting switch may be composed so as to restrict a maximum amount of operation of the driving switch, in accordance with a rotary position of the speed adjusting switch. In other words, if the speed adjusting switch is in a first position, it becomes impossible to operate the driving switch to a great extent and the maximum rotation speed of the cutting blade becomes slow. On the other hand, if the speed adjusting switch is in a second position, it becomes possible to operate the driving switch to a great extent and the maximum rotation speed of the cutting blade becomes fast. Consequently, the speed adjusting switch changes a maximum rotation speed of the cutting blade by mechanically restricting the maximum amount of operation of the driving switch.

Embodiment

A bush cutter 10 according to an embodiment will be described with reference to the drawings. The bush cutter 10 is one type of motorized tool which is used for cutting bushes and brush. As shown in FIG. 1, the bush cutter 10 comprises: a main pole 12, a cutting blade unit 20 provided on an anterior end 12*a* of the main pole 12, and a motor unit 30 provided on a posterior end 12*b* of the main pole 12.

The main pole 12 is a hollow pipe member. A rotating shaft (not illustrated) which extends from the motor unit 30 to the cutting blade unit 20 is provided inside the main pole 12. The cutting blade unit 20 supports the cutting blade 22 rotatably. The cutting blade 22 is detachable with respect to the cutting blade unit 20. It is also possible to install a string-type cutting blade, such as a nylon cord, instead of a plate-shaped cutting blade 22 as shown in FIG. 1, in the cutting blade unit 20.

The motor unit 30 is a unit for driving the cutting blade 22, and incorporates a motor, a reducing gear and a control circuit. The motor unit 30 is connected to the cutting blade 22 of the cutting blade unit 20, by the rotating shaft described above. The rotating shaft transmits the output torque of the motor unit 30 to the cutting blade 22 of the cutting blade unit 20. By this means, the cutting blade 22 is driven so as to rotate. A rechargeable battery pack 32 is installed in the motor unit 30. The battery pack 32 is a power source which supplies electrical power to the motor unit 30, and which is detachable with respect to the motor unit 30.

The bush cutter 10 is also provided with a handle 40 for the user to hold the bush cutter 10. The handle 40 is a bar, which is bent approximately in a U shape. The handle 40 is fixed to an intermediate portion of the main pole 12 (a portion between the anterior end 12*a* and the posterior end 12*b*). The handle 40 is installed in a direction that intersects with the main pole 12.

A left grip 42 and a right grip 44 are provided on the handle 40. The left grip 42 is provided on one end portion of the handle 40 and the right grip 44 is provided on the other end portion of the handle 40. The right grip 44 is connected electrically to the motor unit 30 via an electrical cord 46. In FIG. 1, a part of the electrical cord 46 is omitted from the drawing. The user holds the bush cutter 10 by grasping the left grip 42 with the left hand and grasping the right grip 44 with the right hand. In this case, the cutting blade unit 20 is arranged anterior to the user and the motor unit 30 is posterior to the user.

As shown in FIG. 1, in the present specification, a surface 44*a* arranged on the cutting blade unit 20 side of the right grip 44 is called the anterior surface 44*a* of the right grip 44, and a surface 44*b* arranged on the motor unit 30 side of the right grip 44 is called the posterior surface 44*b* of the right grip 44. A surface 44*d* which is positioned on the left-hand side of the right grip 44 with reference to the anterior surface 44*a* and the posterior surface 44*b* is called the left side surface 44*d* of the right grip 44, and a surface 44*c* which is positioned on the right-hand side of the right grip 44 is called the right side surface 44*c* of the right grip 44 (in FIG. 1, the right side surface 44*c* is not shown). In other words, the anterior surface 44*a* and the posterior surface 44*b* of the right grip 44 are positioned on mutually opposite sides in a lengthwise direction of the main pole 12. The right side surface 44c and the left side surface 44d of the right grip 44 are positioned on mutually opposite sides in a direction that is substantially perpendicular to the lengthwise direction of the main pole 12. When the user grasps the right grip 44 with the right hand, the tip portions of the user's second to fifth fingers are positioned on the anterior surface 44a of the right grip 44, the user's palm is positioned on the posterior surface 44b of the right grip 44, the base end portions of the user's second to fifth fingers are positioned on the right side surface 44c of the right grip 44, and the user's first finger is positioned on the left side surface 44d of the right grip 44.

As shown in FIG. 2, FIG. 3, FIG. 4 and FIG. 5, the right grip 44 is provided with a driving switch 52, a protection switch 54, a speed adjusting switch 56 and a direction changing switch 58. The driving switch 52 is a switch for driving the cutting blade by the motor unit 30. A trigger-type switch is used for the driving switch 52. When the user performs an on operation of the driving switch 52 (in other words, when the user pulls the driving switch 52), the cutting blade 22 is driven by the motor unit 30, and when the user performs an off operation of the driving switch 52 (in other words, when the user returns the driving switch 52), the driving of the cutting blade 22 by the motor unit 30 is halted.

The driving switch 52 is disposed on the anterior surface 44a of the right grip 44 and in particular, is disposed in a range that can be reached by the second and third fingers of the user's right hand which is grasping the right grip 44. According to this composition, the user is able to operate the driving switch 52 with the second and third fingers of the right hand, while grasping the right grip 44 with the right hand. Here, the driving switch 52 changes the rotation speed of the cutting blade 22 in accordance with an amount of operation by the user. In other words, the further the user pulls the driving switch 52, the faster the speed at which the cutting blade 22 is driven to rotate.

The protection switch 54 is a switch which prevents erroneous activation of the cutting blade 22. A push button-type switch is employed for the protection switch 54. In a state where the protection switch 54 is not pressed, an on operation of the driving switch 52 is mechanically disabled due to the protection switch 54 engaging with the driving switch 52. In other words, the user is able to pull the driving switch 52 only while pressing the protection switch 54. Accordingly, the protection switch 54 mechanically disables the erroneous activation of the cutting blade 22 by preventing erroneous operation of the driving switch 52. The protection switch 54 is a switch which releases locking of the driving switch 52 when pressed and is therefore also called a lock-release switch.

When the protection switch 54 is not pressed, supply of current from the battery pack 32 to the motor unit 30 is disabled. Although not shown in the drawings, an electrical circuit which connects the battery pack 32 and the motor unit 30 is provided with a semiconductor switch (more specifically, a field effect transistor) which switches on while the protection switch 54 is pressed. According to this composition, if the protection switch 54 is not being pressed, then the supply of current from the battery pack 32 to the motor unit 30 is disabled, regardless of the state of the driving switch 52. The current is supplied from the battery pack 32 to the motor unit 30 in accordance with the operation of the driving switch 52, only when the protection switch 54 is being pressed. The protection switch 54 is able to electrically disable the erroneous activation of the cutting blade 22, even if shorting occurs in the driving switch 52, for example.

The protection switch 54 is disposed on the upper part of the left side surface 44d of the right grip 44, and in particular is disposed in a range that can be reached by the first finger of the user's right hand which is grasping the right grip 44. According to this composition, the user is able to operate the driving switch 52 with the second and third fingers of the right hand, as well as pressing the protection switch 54 with the first finger of the right hand, while grasping the right grip 44 with the right hand. The user is able to drive the cutting blade 22 and halt the cutting blade 22, without adjusting his or her grasp on the right grip 44.

The speed adjusting switch 56 is a switch for adjusting the rotation speed of the cutting blade 22, and more desirably, is a switch for adjusting a maximum rotation speed of the cutting blade 22. The speed adjusting switch 56 is supported rotatably between a first position which is indicated as "1" and a second position which is indicated as "2". When the speed adjusting switch 56 is in the first position, the maximum rotation speed of the cutting blade 22 is set to a low speed, and when the speed adjusting switch 56 is in the second position, the maximum rotation speed of the cutting blade 22 is set to a high speed.

Speed adjusting switches 56 are provided on both the upper part of the right side surface 44c of the right grip 44 and the upper part of the left side surface 44d of the right grip 44. Here, the speed adjusting switch 56 on the right side surface 44c and the speed adjusting switch 56 on the left side surface 44d are composed by a single member. The speed adjusting switch 56 which is positioned on the upper part of the right side surface 44c is arranged in a range that is reached by the second finger of the user's right hand which is grasping the right grip 44. The speed adjusting switch 56 which is positioned on the upper part of the left side surface 44d is arranged in a range that is reached by the first finger of the user's right hand which is grasping the right grip 44. According to this composition, the user is able to operate the speed adjusting switches 56 with the first finger or second finger of the right hand, while grasping the right grip 44 with the right hand. The user is able to halt the cutting blade 22 by performing an off operation of the driving switch 52, change the maximum rotation speed of the cutting blade 22 by operating the speed adjusting switch 56, and restart driving of the cutting blade 22 by operating the protection switch 54 and the driving switch 52 again, without adjusting his or her grasp on the right grip 44.

On the upper part of the left side surface 44d of the right grip 44, the speed adjusting switch 56 is positioned to the forward side of the protection switch 54 (towards the cutting blade unit 20 side). In other words, from the user's viewpoint, the speed adjusting switch 56 is arranged on the far side of the protection switch 54. The speed adjusting switch 56 is operated with lower frequency than the protection switch 54. For this reason, the speed adjusting switch 56 is arranged on the far side from the user's viewpoint, and the protection switch 54 is arranged on the near side from the user's viewpoint, in such a manner that the user can operate the protection switch 54 readily.

Here, the speed adjusting switch 56 changes the maximum rotation speed of the cutting blade 22 by mechanically restricting the maximum amount of operation of the driving switch 52. In other words, if the speed adjusting switch 56 is in the first position, it becomes impossible to operate the driving switch 52 to a great extent and the maximum rotation speed of the cutting blade 22 becomes slow. On the other hand, if the speed adjusting switch 56 is in the second position, it becomes possible to operate the driving switch 52 to a great extent and the maximum rotation speed of the cutting blade 22 becomes fast. The composition of the speed adjusting switch 56 will be described in detail at a later stage.

Figure 6:
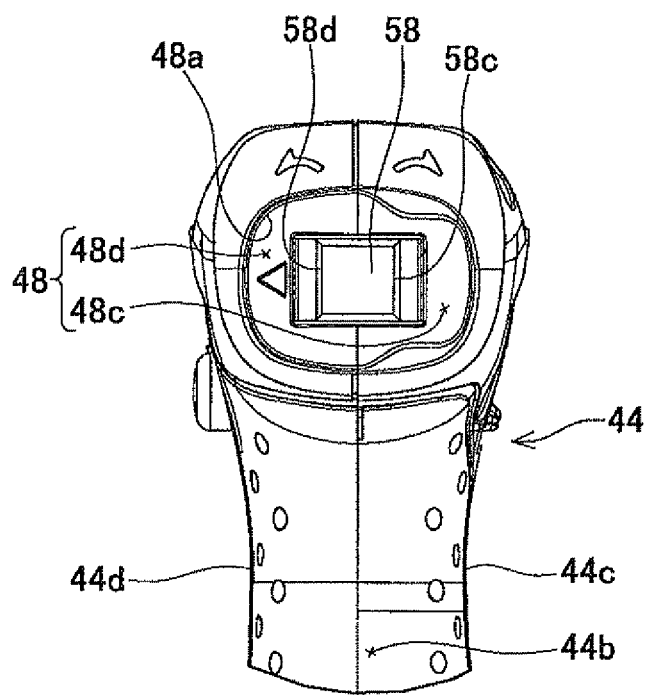
FIG. 6 shows an upper part of the posterior surface of the right grip.

The direction changing switch 58 is a switch which changes the rotation direction of the cutting blade 22. A rotary-type (seesaw-type) switch is used for the direction changing switch 58. In other words, as shown in FIG. 6, the direction changing switch 58 has a structure in which a right side portion 58c and a left side portion 58d are pressed selectively. If the user presses the left side portion 58d of the direction changing switch 58, the rotation direction of the cutting blade 22 is set to a forward direction and if the user presses the right side portion 58c, the rotation direction of the cutting blade 22 is set to a reverse direction. When the cutting blade unit 20 catches on a bush and the cutting blade 22 can no longer rotate, the user is able to drive the cutting blade 22 in an opposite direction by operating the direction changing switch 58.

The direction changing switch 58 is disposed on the upper part of the posterior surface 44b of the right grip 44, and in particular is disposed in a range that can be reached by the first finger of the user's right hand which is grasping the right grip 44. According to this composition, the user is able to operate the direction changing switch 58 with the first finger of the right hand, while grasping the right grip 44 with the right hand. The user is able to halt the cutting blade 22 by performing an off operation of the driving switch 52, set the rotation direction of the cutting blade 22 to an opposite direction by operating the direction changing switch 58, and then drive the cutting blade 22 in the opposite direction by operating the protection switch 54 and the driving switch 52 again, without adjusting his or her grasp on the right grip 44.

Figure 5:
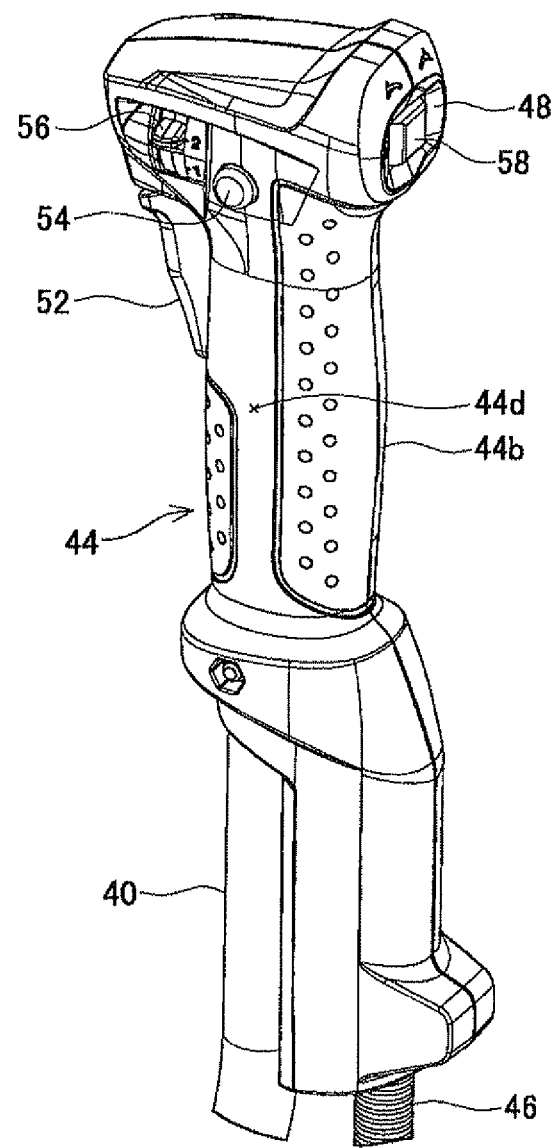
FIG. 5 is a perspective diagram showing a posterior surface and the left side surface of the right grip.

As shown in FIG. 5 and FIG. 6, the direction changing switch 58 is arranged inside a recess section 48 so as not to project with respect to the circumferential surface. By this means, erroneous operation of the direction changing switch 58 is prevented. As shown in FIG. 6, the recess section 48 is open asymmetrically in the left/right direction. More specifically, the surface area of the opening 48a is smaller in the right side portion 48c of the recess section 48 and the surface area of the opening 48a is larger in the left side portion 48d of the recess section 48. The left side portion 58d of the direction changing switch 58 is positioned in the left side portion 48d of the recess section 48. The left side portion 58d of the direction changing switch 58 is a portion which is operated by the user when setting the rotation direction of the cutting blade 22 to a forward direction. On the other hand, the right side portion 58c of the direction changing switch 58 is a portion which is operated by the user when setting the rotation direction of the cutting blade 22 to a reverse direction. By opening the recess section 48 in asymmetrical fashion in the left/right direction, the erroneous operation of the direction changing switch 58 by the user is prevented both visually and physically. In this case, desirably, the left side portion 48d of the recess section 48 has a larger opening, since the user more frequently operates the left side portion 58d of the direction changing switch 58 in order to rotate the cutting blade 22 in the forward direction. In the present embodiment, erroneous operation of the direction changing switch 58 by the user is prevented both visually and physically, by forming a larger opening in the left side portion 48d of the recess section 48 in accordance with the left side portion 58d of the direction changing switch 58 which is operated when setting the rotation direction to the forward direction.

As described above, four switches, a driving switch 52, a protection switch 54, a speed adjusting switch 56 and a direction changing switch 58 are provided in the right grip 44. Apart from these four switches, no other switches are provided on the bush cutter 10. In the bush cutter 10, since all of the switches are concentrated on the right grip 44, the user is able to operate each of the switches without releasing his or her hand from the right grip 44. In other words, the user is able to drive the cutting blade 22, halt the cutting blade 22, adjust the rotation direction of the cutting blade 22 and switch the rotation direction of the cutting blade 22, appropriately, while grasping the left and right grips 42, 44.

Figure 7:
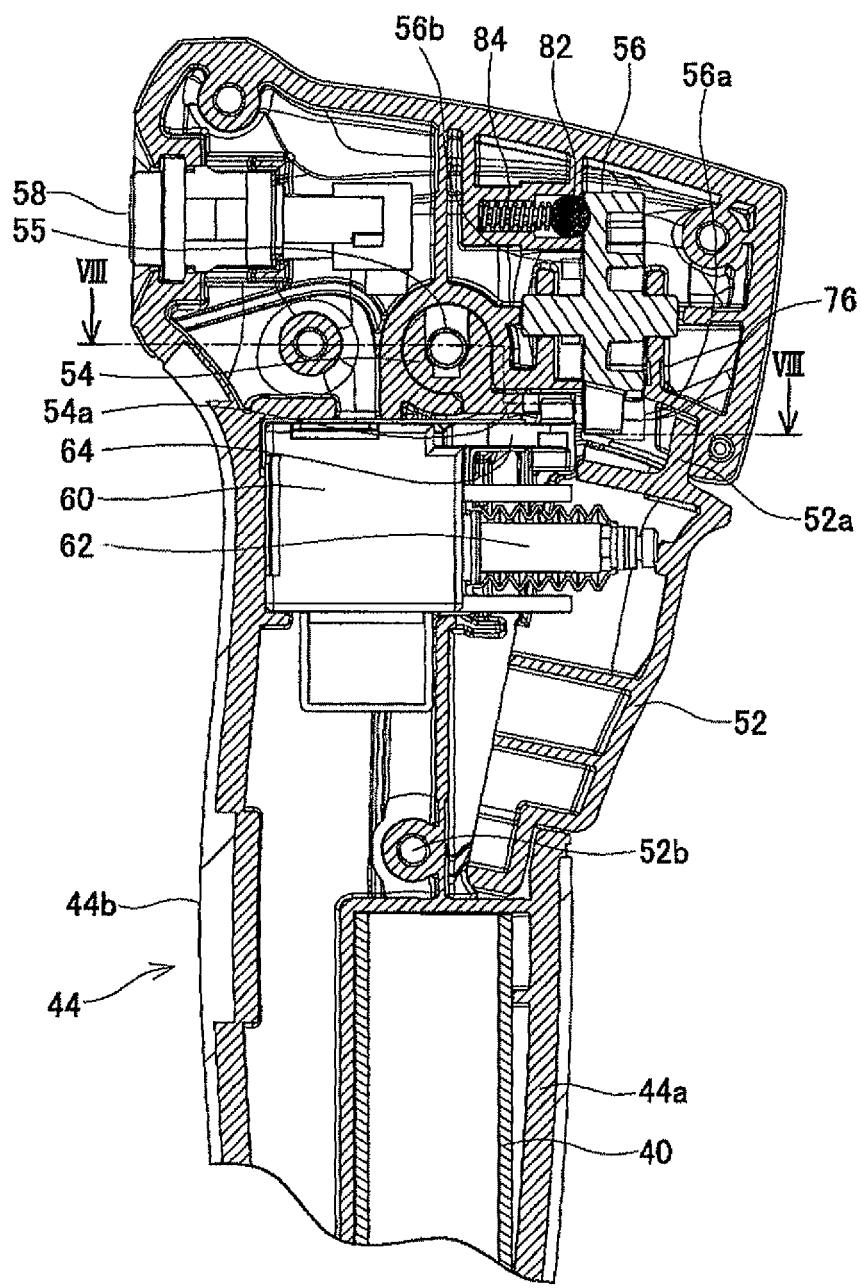
FIG. 7 is a cross-sectional diagram showing an internal structure of the right grip.

Next, an internal structure of the right grip 44 is described with reference to FIG. 7 and FIG. 8. As shown in FIG. 7, the driving switch 52 is supported by a pin 52b and is supported rockably about a pin 52b. A stopper 52a which projects in a plate shape is provided on the upper part of the driving switch 52. The stopper 52a abuts against an inner surface of the right grip 44 at the position where the driving switch 52 projects furthest from the right grip 44.

A switch module 60 is provided on a rear side of the driving switch 52. The switch module 60 has a first movable element 62. The first movable element 62 is supported so as to be advanceable and retractable with respect to the driving switch 52, and is impelled towards the driving switch 52. An anterior end of the first movable element 62 abuts against the driving switch 52, and the first movable element 62 advances and retracts in accordance with the amount of operation of the driving switch 52 performed by the user. The switch module 60 outputs a voltage signal corresponding to the position of the first movable element 62, as a drive command signal for the cutting blade 22. The drive command signal output by the switch module 60 is input to the motor unit 30 via the electrical cord 46. The motor unit 30 adjusts the rotation speed of the motor provided therein, on the basis of the received drive command signal. The switch module 60 is also provided with a second moving element 64. The switch module 60 outputs an on signal in accordance with the position of the second movable element 64. As described below, the second movable element 64 is connected to the protection switch 54.

Figure 8:
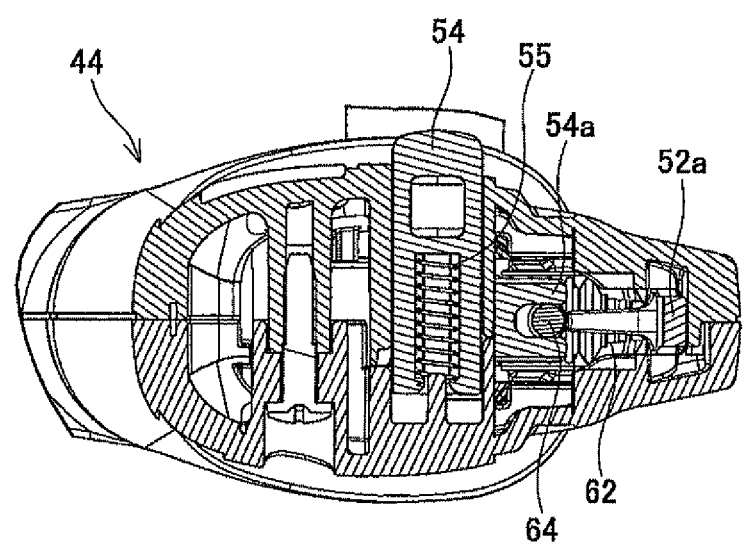
FIG. 8 is a cross-sectional diagram along line VIII-VIII in FIG. 7.

As shown in FIG. 7 and FIG. 8, the protection switch 54 is supported slidably by the right grip 44, as well as being impelled in a direction so as to project from the right grip 44, by the coil spring 55. An abutting section 54a which abuts with the driving switch 52 is provided on the protection switch 54. When the protection switch 54 is not being pressed, the abutting section 54a of the protection switch 54 is situated at a position opposing the driving switch 52. In this case, even if the user attempts to pull the driving switch 52, the driving switch 52 abuts against the abutting section 54a of the protection switch 54 and therefore the user is not able to pull the driving switch 52. On the other hand, when the protection switch 54 is pressed, the abutting section 54a of the protection switch 54 moves to a position that does not oppose the driving switch 52. Consequently, the user becomes able to pull the driving switch 52.

A second movable element 64 of the switch module 60 is connected to the abutting section 54a of the protection switch 54. Accordingly, the switch module 60 outputs an on signal in accordance with the position of the protection switch 54. More specifically, the switch module 60 does not output an on signal when the protection switch 54 is not being pressed, and the switch module 60 only outputs an on signal when the protection switch 54 is being pressed. The on signal output by the switch module 60 is input to the motor unit 30 via the electrical cord 46. The motor unit 30 electrically connects the battery pack 32 and the in-built motor, only when the motor unit 30 receives an on signal. Here, even if the motor unit 30 receives the aforementioned drive command signal from the switch module 60, the motor unit 30 electrically disconnects the battery pack 32 and the motor unless an on signal is received from the switch module 60.

Figure 9:
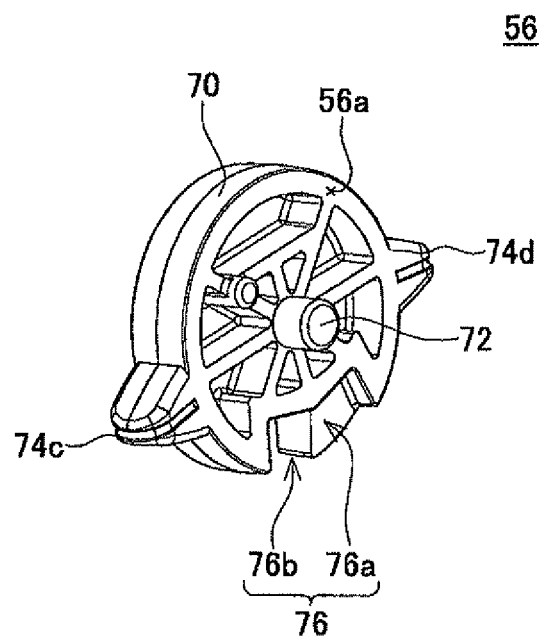
FIG. 9 is a perspective diagram showing an anterior surface of a speed adjusting switch.
Figure 10:
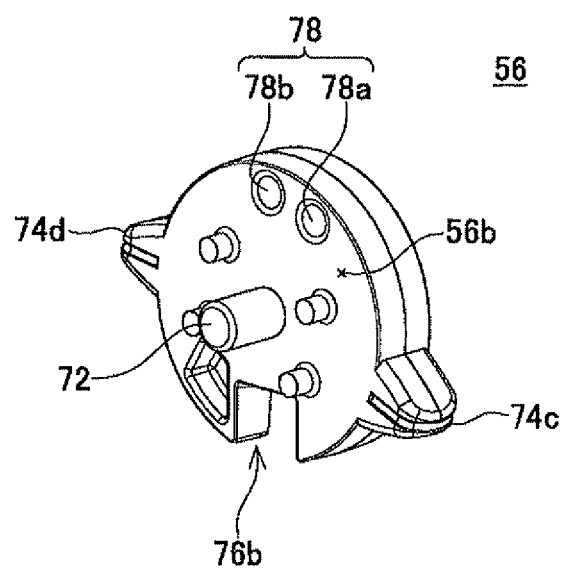
FIG. 10 is a perspective diagram showing a posterior surface of the speed adjusting switch.

As shown in FIG. 7, FIG. 9 and FIG. 10, the speed adjusting switch 56 mainly comprises a circular disk section 70, and a shaft section 72 extending along the central axis of the circular disk section 70. The shaft section 72 is supported by the right grip 44. By using this, the speed adjusting switch 56 becomes rotatable between a first position to which the switch is rotated in one direction and a second position to which the switch is rotated in the other direction. The stopper 52a of the driving switch 52 opposes an anterior surface 56a of the speed adjusting switch 56. Furthermore, an engaging ball 82 which is impelled by the coil spring 84 abuts against a posterior surface 56b of the speed adjusting switch 56.

Two operating projections 74c, 74d are provided in the circular disk section 70 of the speed adjusting switch 56. The two operating projections 74c, 74d are positioned on opposite sides of the central axis of the circular disk section 70. One operating section 74c projects from the right side surface 44c of the right grip 44, and the other operating section 74d projects from the left side surface 44d of the right grip 44 (see FIG. 2 to FIG. 5). The one operating projection 74c is operated by the user's second finger, and the other operating projection 74d is operated by the user's first finger. The user is able to rotate the speed adjusting switch 56 by operating either of the operating projections 74c, 74d.

As shown in FIG. 7, the stopper 52a of the driving switch 52 opposes an anterior surface 56a of the speed adjusting switch 56. As shown in FIG. 7 and FIG. 9, a cutaway section 76 for receiving the stopper 52a when the driving switch 52 is pulled is provided in the speed adjusting switch 56. The cutaway section 76 has a first cutaway section 76a and a second cutaway section 76b which is deeper than the first cutaway section 76a. When the speed adjusting switch 56 is in the first position, the stopper 52a of the driving switch 52 is received by the first cutaway section 76a. When the speed adjusting switch 56 is in the second position, the stopper 52a of the driving switch 52 is received by the second cutaway section 76b. Consequently, if the speed adjusting switch 56 is in the first position, it becomes impossible to operate the driving switch 52 to a great extent and the maximum rotation speed of the cutting blade 22 becomes slow. On the other hand, if the speed adjusting switch 56 is in the second position, it becomes possible to operate the driving switch 52 to a great extent and the maximum rotation speed of the cutting blade 22 becomes fast. As shown in FIG. 10, the second cutaway section 76b extends to the posterior surface 56b of the speed adjusting switch 56.

Here, the speed adjusting switch 56 may be provided with a greater number of cutaway sections 76 than the two cutaway sections 76a and 76b. By providing a greater number of cutaway sections 76, it is possible to adjust the rotation speed of the cutting blade 22 in a greater number of steps.

As shown in FIG. 10, a plurality of recess sections 78 which receives the engaging ball 82 is formed in the posterior surface 56b of the speed adjusting switch 56. The plurality of recess sections 78 includes a first recess section 78a and a second recess section 78b. When the speed adjusting switch 56 is in the first position, the engaging ball 82 engages with the first recess section 78a, and when the speed adjusting switch 56 is in the second position, the engaging ball 82 engages with the second recess section 78b. Due to the engaging ball 82 engaging with the recess sections 78, the speed adjusting switch 56 is prevented from being moved unintentionally.

As described above, the speed adjusting switch 56 according to the present embodiment changes the maximum rotation speed of the cutting blade 22 by changing the maximum amount of operation of the driving switch 52. The speed adjusting switch 56 has a mechanical structure only and does not have a dedicated electrical circuit. According to this structure, the internal structure of the right grip 44 is simplified, and increase in the size of the right grip 44 can be avoided.

The above has described the embodiment of the present invention in detail, but this embodiment is merely exemplary of the present invention and not intended to limit the scope of the claims. The technologies described in the claims include a variety of examples obtained by modifying or changing the above-described embodiments.

The technical components described in the present specification or the drawings can be used independently or combined with other components to demonstrate the technical utility, and should not be limited to the combinations of the claims presented at the time of the filing of this application. The technologies illustrated in the present specification or the drawings accomplish a plurality of objectives simultaneously and provide the technical utility simply by achieving one of the objectives.

The invention claimed is:

1. A bush cutter comprising:
a main pole;
a cutting blade disposed at an anterior end of the main pole;
a prime mover disposed at a posterior end of the main pole and configured to drive the cutting blade; and
a handle disposed at an intermediate portion of the main pole and provided with a grip that is configured to be grasped by a user, wherein
the grip is provided with a driving switch for driving the cutting blade, and a speed adjusting switch for adjusting a rotation speed of the cutting blade,
the speed adjusting switch comprises a first operating projection that projects from a first side surface of the grip and a second operating projection that projects from a second side surface of the grip, the second side surface facing an opposite direction relative to the first side surface, and
the speed adjusting switch comprises a cutaway section that is configured to receive a part of the driving switch when the driving switch is manually-operated by the user.

2. The bush cutter as in claim 1, wherein
the speed adjusting switch is supported by the grip and is rotatable relative to the grip,
the first operating projection extends in a first direction that the first side surface faces,
the second operating projection extends in a second direction that the second side surface faces, and
the second direction is an opposite direction of the first direction.

3. The bush cutter as in claim 2, wherein
the speed adjusting switch is configured to be movable between a first position and a second position,
the cutaway section includes a first cutaway section and a second cutaway section that is deeper than the first cutaway section,
the first cutaway section is configured to receive the part of the driving switch when the speed adjusting switch is located at the first position, and
the second cutaway section is configured to receive the part of the driving switch when the speed adjusting switch is located at the second position.

4. The bush cutter as in claim 3, wherein the cutaway section intersects with a straight line extending in a third direction from a rotation axis of the speed adjusting switch and the third direction is perpendicular to both the first direction and the second direction.

5. The bush cutter as in claim 1, wherein
the speed adjusting switch is configured to be movable between a first position and a second position,
the cutaway section includes a first cutaway section and a second cutaway section that is deeper than the first cutaway section,
the first cutaway section is configured to receive the part of the driving switch when the speed adjusting switch is located at the first position, and
the second cutaway section is configured to receive the part of the driving switch when the speed adjusting switch is located at the second position.

6. A bush cutter comprising:
a main pole;
a cutting blade disposed at an anterior end of the main pole;
a prime mover disposed at a posterior end of the main pole and configured to drive the cutting blade; and
a handle disposed at an intermediate portion of the main pole and provided with a grip that is configured to be grasped by a user, wherein
the grip is provided with a driving switch for driving the cutting blade, and an speed adjusting switch for adjusting a rotation speed of the cutting blade,
the speed adjusting switch comprises a cutaway section that is configured to receive a part of the driving switch when the driving switch is manually-operated by the user, and
the cutaway section including a first cutaway section and a second cutaway section that is deeper than the first cutaway section.

7. The bush cutter as in claim 6, wherein
the speed adjusting switch is configured to be movable between a first position and a second position,
the first cutaway section is configured to receive the part of the driving switch when the speed adjusting switch is located at the first position, and
the second cutaway section is configured to receive the part of the driving switch when the speed adjusting switch is located at the second position.

8. The bush cutter as in claim 6, wherein the speed adjusting switch is supported by the grip and is rotatable relative to the grip.

9. The bush cutter as in claim 8, wherein the cutaway section intersects with a straight line extending in a direction from a rotation axis of the speed adjusting switch.

* * * * *